(12) United States Patent
Odaira

(10) Patent No.: US 9,019,580 B2
(45) Date of Patent: Apr. 28, 2015

(54) IMAGE FORMING APPARATUS THAT PERFORMS GRADATION CORRECTION, METHOD OF CONTROLLING THE SAME, AND STORAGE MEDIUM

(71) Applicant: Canon Kabushiki Kaisha, Toyko (JP)

(72) Inventor: Masahiro Odaira, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/886,370

(22) Filed: May 3, 2013

(65) Prior Publication Data

US 2013/0293905 A1    Nov. 7, 2013

(30) Foreign Application Priority Data

May 7, 2012   (JP) .................................. 2012-105992

(51) Int. Cl.
| | |
|---|---|
| *G03F 3/08* | (2006.01) |
| *H04N 1/04* | (2006.01) |
| *G03G 15/00* | (2006.01) |
| *H04N 1/60* | (2006.01) |
| *H04N 1/00* | (2006.01) |

(52) U.S. Cl.
CPC ............. *H04N 1/04* (2013.01); *G03G 15/5025* (2013.01); *H04N 1/6033* (2013.01); *H04N 1/00596* (2013.01)

(58) Field of Classification Search
CPC ... G03G 15/01; G03G 15/5025; H04N 1/407; H04N 1/60; H04N 1/04
USPC .................. 358/498, 474, 521, 504, 505, 406
See application file for complete search history.

(56) References Cited

U.S. PATENT DOCUMENTS

| | | | | |
|---|---|---|---|---|
| 5,884,118 | A * | 3/1999 | Mestha et al. ................... | 399/15 |
| 8,570,605 | B2 * | 10/2013 | Murase ........................ | 358/3.26 |
| 8,693,060 | B2 * | 4/2014 | Ito ................................ | 358/3.26 |
| 2005/0237548 | A1 * | 10/2005 | Suzuki .......................... | 358/1.9 |
| 2006/0164700 | A1 * | 7/2006 | Hayashi ........................ | 358/518 |
| 2006/0244980 | A1 * | 11/2006 | Grace ............................ | 358/1.9 |
| 2007/0285743 | A1 * | 12/2007 | Hirayama ..................... | 358/504 |
| 2009/0147289 | A1 * | 6/2009 | Fujita ............................ | 358/1.9 |
| 2009/0244138 | A1 * | 10/2009 | Konno ........................... | 347/12 |
| 2010/0067932 | A1 * | 3/2010 | Fujiwara ....................... | 399/55 |
| 2012/0076560 | A1 * | 3/2012 | Noguchi et al. .............. | 400/76 |

FOREIGN PATENT DOCUMENTS

| | | |
|---|---|---|
| JP | 07-298072 A | 11/1995 |
| JP | 2000-185881 A | 7/2000 |

* cited by examiner

*Primary Examiner* — Benny Q Tieu
*Assistant Examiner* — Quyen V Ngo
(74) *Attorney, Agent, or Firm* — Rossi, Kimms & McDowell LLP

(57) ABSTRACT

An image forming apparatus capable of performing gradation correction without causing a user to perform a troublesome operation. The image forming apparatus includes an image reading unit that reads an original. A chart is formed on a recording material, and the recording material having the chart formed thereon is conveyed to the image reading unit via a shared conveying path used for both of reading the original and forming an image on the recording material. The conveyed recording material is read by the image reading unit, and gradation correction is performed based on the chart read by the image reading unit.

8 Claims, 15 Drawing Sheets

IMAGE FORMING APPARATUS THAT PERFORMS GRADATION CORRECTION, METHOD OF CONTROLLING THE SAME, AND STORAGE MEDIUM

BACKGROUND OF THE INVENTION

1. Field of the Invention

The present invention relates to an image forming apparatus that performs gradation correction, a method of controlling the same, and a storage medium.

2. Description of the Related Art

Conventionally, in an image forming apparatus, an original conveying system of an image reading unit that conveys an original and reads an image of an original being conveyed, and a recording material-conveying system of a printing unit for conveying recording materials are constructed independently of each other.

More specifically, the original conveying system and the recording material-conveying system are each provided, independently of each other, with a sheet feeder from which originals or recording materials are fed, a sheet feeding unit, guiding members for forming predetermined conveying paths, and so on. Further, the original conveying system and the recording material-conveying system are each provided with a plurality of conveying roller pairs, drive force transmission units for transmitting drive forces to the plurality of conveying roller pairs, motors as drive sources, drive circuits of the motors, a sheet discharging section, and so on.

For this reason, it has been inevitable that the entire mechanism construction of the image forming apparatus becomes increasingly complex and the cost and size of the apparatus are increased.

To solve these problems, there has been proposed an image forming apparatus in which an image reading unit is provided in a recording material-conveying path extending from a sheet feeder to a sheet discharger, whereby respective path sections of the original conveying system and the recording material-conveying system are formed as a section which can be shared between the two systems, to thereby attain reduction of the size of the image forming apparatus (see e.g. Japanese Patent Laid-Open Publication No. 2000-185881).

Further, conventionally, there has been known a method in which an image forming apparatus outputs a test chart formed by a specific gradation pattern to a recording material as an image, reads the gradation pattern on the recording material using an image reading unit, and performs gradation correction based on information obtained from the read image. Based on this method, image quality is preserved, improved, or stabilized (see e.g. Japanese Patent Laid-Open Publication No. H07-298072).

In the above-mentioned technical background, the image forming apparatus disclosed in Japanese Patent Laid-Open Publication No. 2000-185881 has the image reading unit arranged in an intermediate portion of the recording material-conveying path e.g. between a fixing device and the sheet discharger, and hence the path for conveying an original to be read becomes long. This configuration makes it difficult to reduce time for reading the original.

Further, since the image reading unit is provided in the recording material-conveying path used for usual printing, when an original is in the recording material-conveying path, it is impossible to perform a printing operation. Therefore, it is required to stop the printing operation during an original reading operation.

Further, the technique disclosed in Japanese Patent Laid-Open Publication No. H07-298072 has a problem that the user is required to set the output test chart on the reading unit by himself/herself. Further, to perform gradation correction with increased accuracy, a plurality of test charts are needed, and hence the user is required to perform a test chart-setting operation each time. Further, if a recording material to be used is a colored paper sheet or a sheet on which printing has been performed, it is impossible to properly perform gradation correction.

SUMMARY OF THE INVENTION

The present invention provides an image forming apparatus capable of performing gradation correction without causing the user to perform a troublesome operation, a method of controlling the image forming apparatus, and a storage medium.

In a first aspect of the present invention, there is provided an image forming apparatus comprising a reading unit configured to read an original, an image forming unit configured to form a chart on a recording material, a conveying unit configured to convey the recording material having the chart formed thereon by the image forming unit, to the reading unit, via a shared conveying path commonly used for both of reading the original and forming an image on the recording material, and a correction unit configured to cause the reading unit to read the recording material conveyed by the conveying unit, and perform gradation correction based on the chart read by the reading unit.

In a second aspect of the present invention, there is provided a method of controlling an image forming apparatus, comprising conveying a recording material having a chart formed thereon by an image forming unit, to a reading unit, via a shared conveying path commonly used for both of reading the original and forming an image on the recording material, and causing the reading unit to read the recording material conveyed by a conveying unit, and performing gradation correction based on the chart read by the reading unit.

In a third aspect of the present invention, there is provided a non-transitory computer-readable storage medium storing a computer-executable program for executing a method of controlling an image forming apparatus, wherein the method comprises conveying a recording material having a chart formed thereon by an image forming unit, to a reading unit, via a shared conveying path commonly used for both of reading the original and forming an image on the recording material, and causing the reading unit to read the recording material conveyed by a conveying unit, and performing gradation correction based on the chart read by the reading unit.

According to the present invention, it is possible to provide an image forming apparatus capable of performing gradation correction without causing the user to perform a troublesome operation.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. Note that in the following description, processing for forming an image on a recording material is sometimes expressed as printing.

Figure 1:
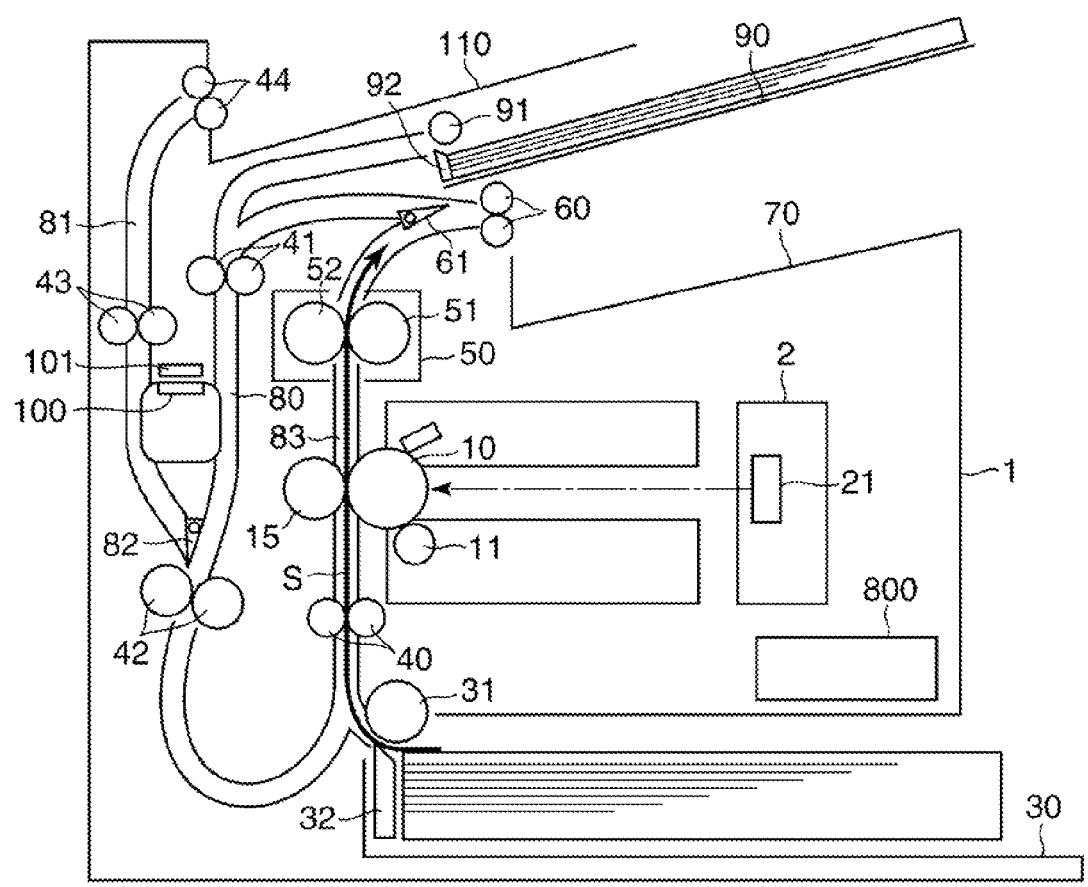
FIG. 1 is a schematic diagram of an image forming apparatus according to an embodiment of the present invention.

FIG. 1 is a schematic diagram of an image forming apparatus 1 according to an embodiment of the present invention.

In FIG. 1, the image forming apparatus 1 is provide with a shared conveying path 80, an original-dedicated conveying path 81, and an image-forming conveying path 83. The shared conveying path 80 is a conveying path configured to be shared for both of conveyance of an original and conveyance of a recording sheet, and is used e.g. during double-sided printing. The original-dedicated conveying path 81 is used for conveying an original to be read. Further, the image forming conveying path 83 is a conveying path used for conveying a recording sheet when an image is printed on the recording sheet.

Along these conveying paths, a recording sheet is conveyed by a CST pickup roller 31, conveying roller pairs 40, 41, 42, 43, and 44, a heating roller 51, a pressure roller 52, a discharge roller pair 60, a double-sided-printing flapper 61, a switchback flapper 82, and so forth. A CIS pickup roller 91 and a sheet separator 92 convey originals placed in a second sheet feeder 90 to the conveying roller pair 41 one by one. Further, the originals are discharged by the conveying roller pair 44 onto a second discharge section 110.

Further, an image reading unit 100 as a reading unit that reads an original is configured to be rotatable. More specifically, the image reading unit 100 is rotatable such that it can selectively face a white reference member 101, the shared conveying path 80, and the original-dedicated conveying path 81.

Further, electrical equipment 800 controls the overall operation of the image forming apparatus 1. The construction of the electrical equipment 800 will be described hereinafter.

Hereafter, a description will be given of the image forming apparatus 1 by focusing on the movement of a recording sheet (recording material) with reference to FIGS. 1 to 7. First, with reference to FIG. 1, a process up to the completion of single-sided printing or a process up to the completion of printing on one side of a sheet in double-sided printing will be described.

In FIG. 1, in the center of the image forming apparatus 1, there are provided a rotatable photosensitive drum 10 as an image bearing member, a developing roller 11 which is arranged in parallel with the photosensitive drum 10 and rotates while holding toner, and a transfer roller 15, which are component elements of an image forming unit configured to form an image on recording material.

Upon receipt of a print signal indicative of a print instruction from a host computer, not shown, or an operating section 870, referred to hereinafter, a light emitting section 21 provided in an optical unit 2 irradiates a surface of the rotating photosensitive drum 10 with a laser beam. On the surface of the photosensitive drum 10 irradiated with the laser beam, an electrostatic latent image is formed.

The developing roller 11 supplies toner held therein onto the latent image on the surface of the photosensitive drum 10 while rotating, whereby a toner image is formed on the surface of the photosensitive drum 10.

Although in the present embodiment, only one image forming unit is shown for simplification of explanation, image forming units which form images using toner of four colors of C (cyan), M (magenta), Y (yellow), and K (black), respectively, may be provided. The image forming units of the respective colors are arranged in a direction perpendicular to ground when the image forming apparatus shown in FIG. 1 is set up, and form images of respective colors of Y, M, C, and K in the mentioned order on a recording sheet S fed from a first sheet feeder 30, using the respective photosensitive drums.

On the other hand, recording sheets S placed in the first sheet feeder 30 are conveyed by the CST pickup roller 31 and a sheet separator 32 to the conveying roller pair 40 one by one. The conveying roller pair 40 conveys each recording sheet S to a transfer roller 15 such that a toner image on the surface of the photosensitive drum 10 and a leading end of the recording sheet S meet at the transfer roller 15 in proper timing.

The toner image conveyed by rotation of the photosensitive drum 10 to the transfer roller 15 is transferred onto the recording sheet S by an applied bias voltage and pressure provided to the transfer roller 15. Further, the transfer roller 15 conveys the recording sheet S to a fixing section 50.

In the fixing section 50, the toner image is fixed onto the recording sheet S by heat from the rotatable heating roller 51 and pressure of the rotatable pressure roller 52 opposed to the heating roller 51. The recording sheet S having the toner image fixed thereon is conveyed to the discharge roller pair 60.

In the case of single-sided printing, the discharge roller pair 60 conveys the recording sheet S directly out onto a first discharge section 70, where the recording sheet S is stacked, whereby the single-sided printing is completed. To improve accuracy of alignment of the printed recording sheets, the first discharge section 70 is provided with a slope gradually rising from the vicinity of a discharge outlet in a recording sheet-discharging direction.

Figure 2:
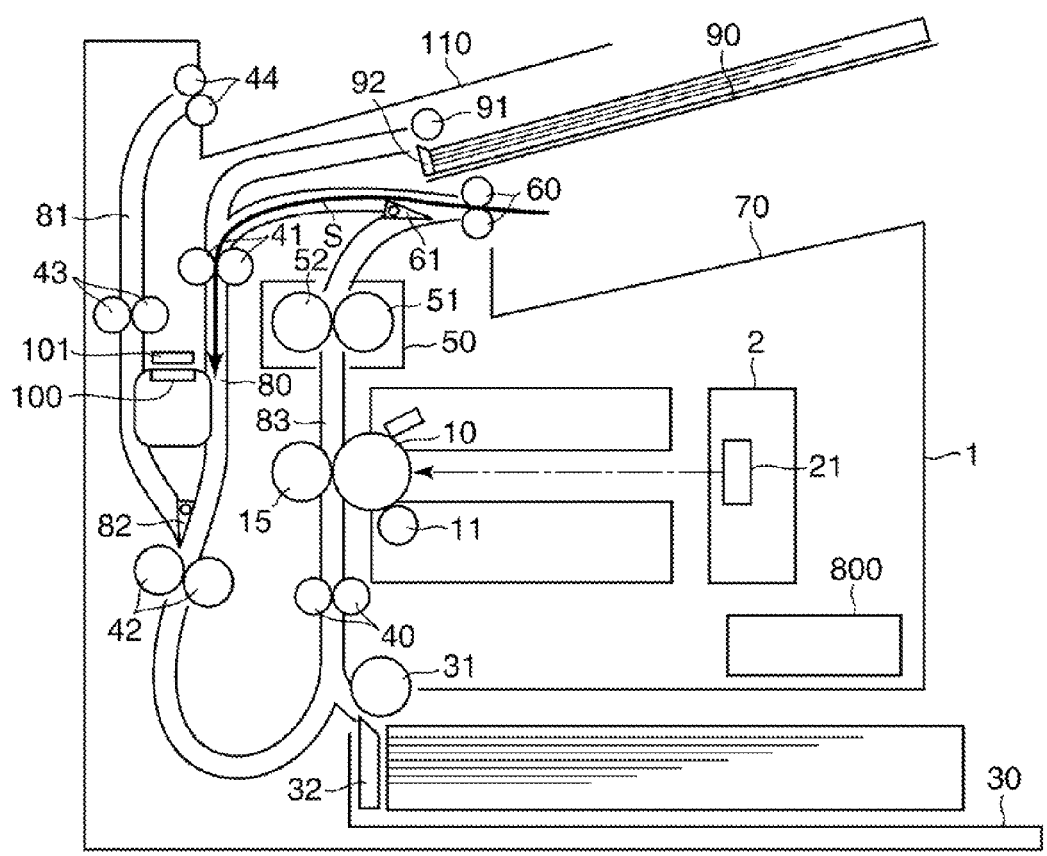
FIG. 2 is a schematic diagram of the image forming apparatus, which is useful in explaining a process up to the completion of double-sided printing.

On the other hand, in the case of double-sided printing, the recording sheet S is not conveyed out by the discharge roller pair 60, but is caused to switch back as described hereafter with reference to FIG. 2.

FIG. 2 is a schematic diagram of the image forming apparatus 1, which is useful in explaining a process up to the completion of double-sided printing.

Following the process described with reference to FIG. 1, particularly for double-sided printing, during conveyance of the recording sheet S by the discharge roller pair 60, when a trailing end of the recording sheet S passes the double-sided-printing flapper 61, the double-sided-printing flapper 61 switches the conveying path. Then, the discharge roller pair 60 is reversely rotated to convey the recording sheet S to the shared conveying path 80 to thereby cause the recording sheet S to switch back.

The recording sheet S caused to switch back is conveyed to the image reading unit 100 by the conveying roller pair 41. Then, the recording sheet S is conveyed again by the conveying roller pairs 42 and 40 to the transfer roller 15, where a toner image is transferred and fixed thereon, and then the recording sheet S is stacked on the first discharge section 70, thereby completing the double-sided printing.

Next, with reference to FIGS. 3 to 7, a process in which the image forming apparatus 1 reads both sides of an original and prints on both sides of a sheet will be described in detail.

Figure 3:
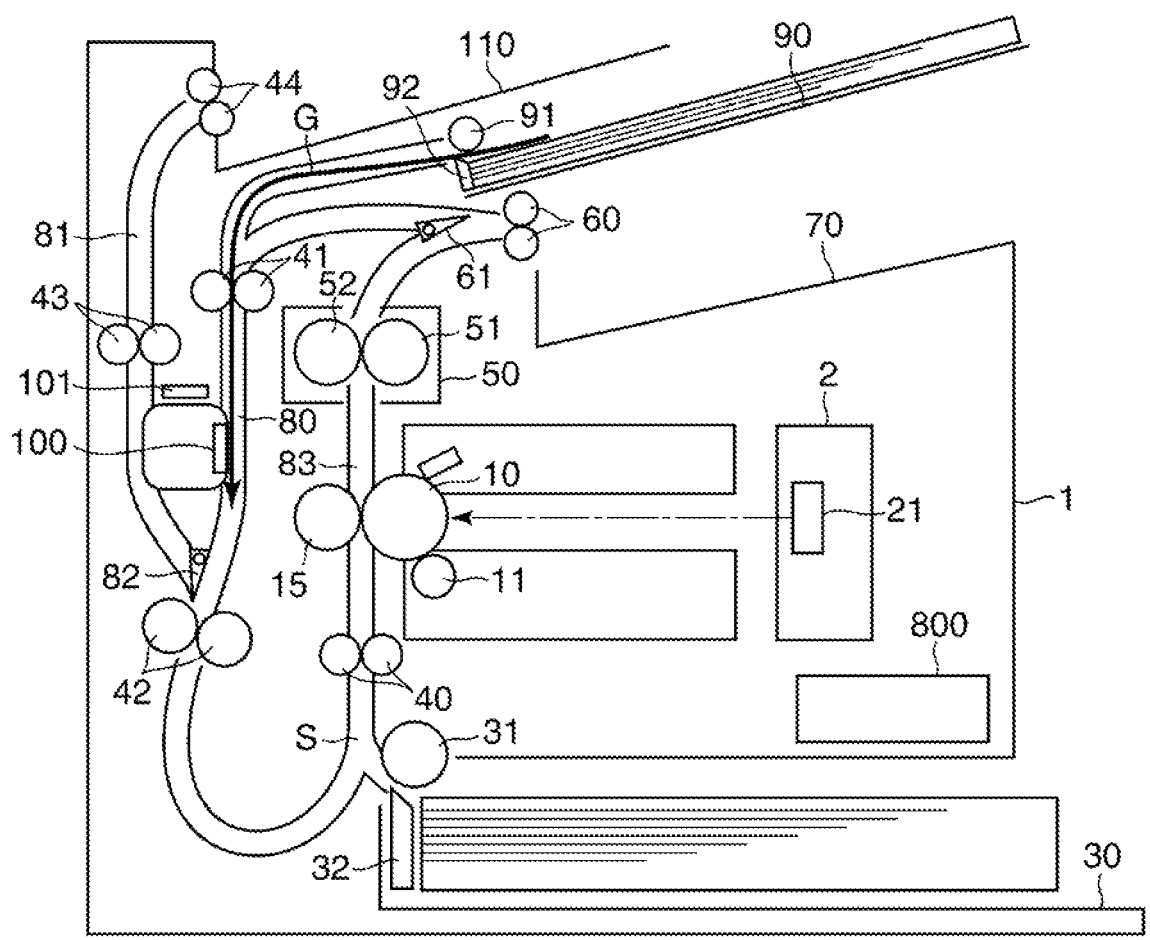
FIG. 3 is a schematic diagram of the image forming apparatus, which is useful in explaining a process up to the completion of reading of a front side of an original.

FIG. 3 is a schematic diagram of the image forming apparatus 1, which is useful in explaining a process up to the completion of reading a front side of the original.

In FIG. 3, originals G set in the second sheet feeder 90 are conveyed to the conveying roller pair 41 by the CIS pickup roller 91 and the sheet separator 92 one by one.

On the other hand, the image reading unit 100 performs correction of white reference values of the white reference member 101, and is then rotated to a position facing the shared conveying path 80 before the start of reading of a first side which is the front side of the original G fed from the second sheet feeder 90. The conveying roller pair 41 conveys the original G to the image reading unit 100.

At this time, the image reading unit 100 has already been waiting in a second reading position which is a position facing the shared conveying path 80, and one side of the original G is read by the image reading unit 100. The image data read by the image reading unit 100 is stored in an image memory 804 (see FIG. 8), referred to hereinafter, as the image data of the first side of the original.

Note that the white reference member 101 is disposed facing downward so as to prevent dust from attaching thereto.

Figure 4:
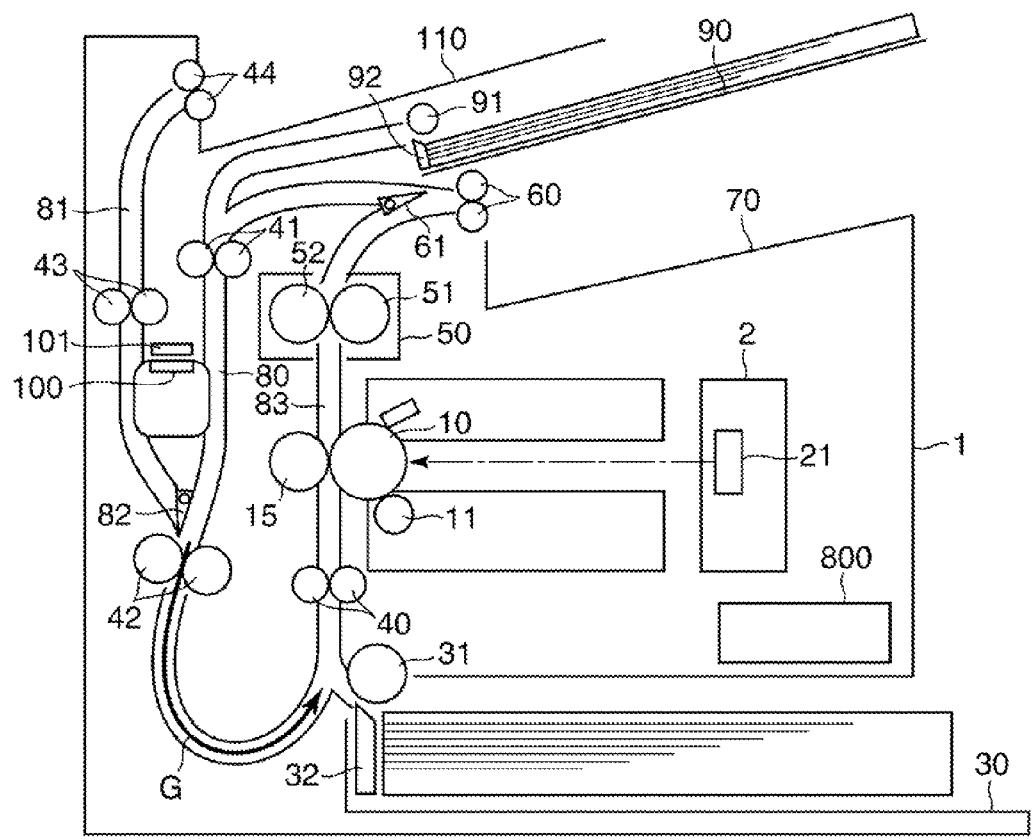
FIG. 4 is a schematic diagram of the image forming apparatus, which is useful in explaining operations performed on the original after reading the front side thereof.

FIG. 4 is a schematic diagram of the image forming apparatus 1, which is useful in explaining operations performed on the original G after reading the front side thereof.

In FIG. 4, the original G having passed the image reading unit 100 is conveyed to the conveying roller pair 42. The conveying roller pair 42 is stopped at a time point when the trailing end of the original G passes the switchback flapper 82. Therefore, the original G is at rest in a state sandwiched by the conveying roller pair 42. After the elapse of a predetermined time period, the original G is conveyed from this state to the original-dedicated conveying path 81.

More specifically, the image reading unit 100 reads a white reference image and a black reference image from the white reference member 101 when the image reading unit is in the position facing the white reference member 101, where the image reading unit 100 is halfway through rotation to the position facing the original-dedicated conveying path 81, which is being performed so as to read a second side of the original. The image reading unit 100 reads the white reference image and the black reference image from the white reference member 101 before the start of reading of the second side which is a reverse side of the original.

Figure 5:
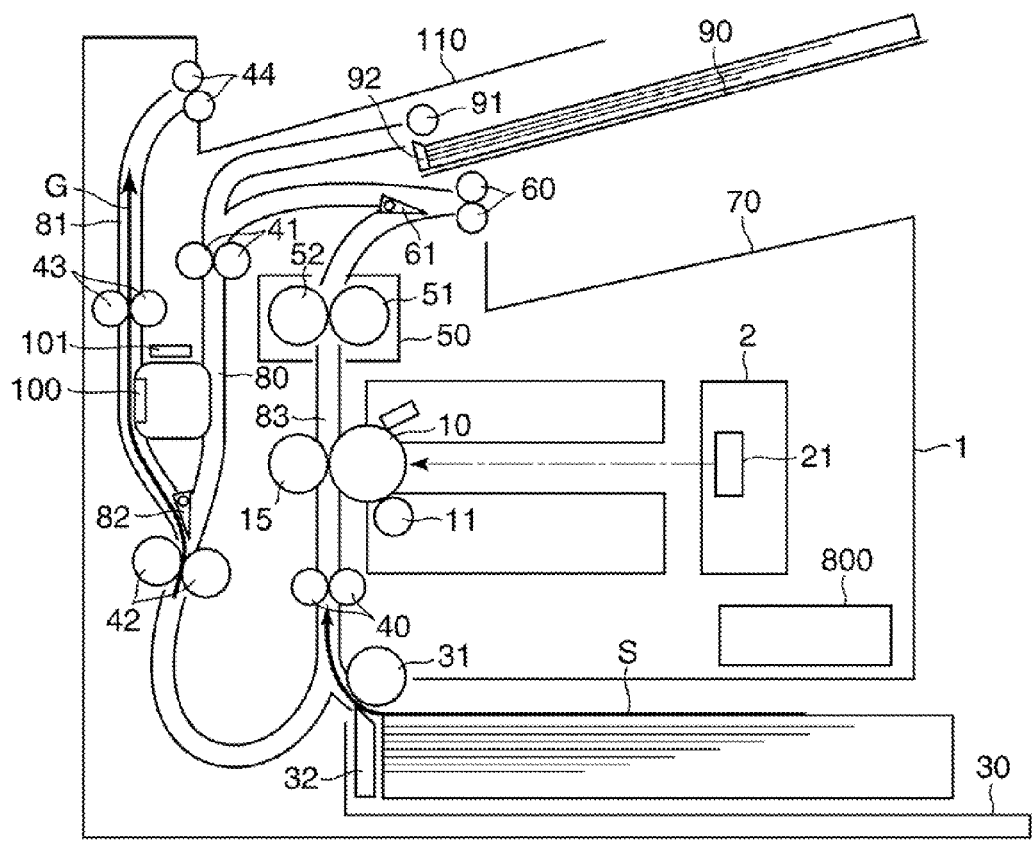
FIG. 5 is a schematic diagram of the image forming apparatus, which is useful in explaining a process for reading a reverse side of the original.

FIG. 5 is a schematic diagram of the image forming apparatus 1, which is useful in explaining a process for reading the reverse side of the original.

In FIG. 5, almost as soon as the switchback flapper 82 switches the destination of conveying the original G from the shared conveying path 80 to the original-dedicated conveying path 81, the image reading unit 100 is rotated to a first reading position which is the position facing the original-dedicated conveying path 81.

When the conveying roller pair 42 is reversely rotated, the original G is conveyed to the image reading unit 100 along the original-dedicated conveying path 81.

The original G is conveyed to the image reading unit 100, and as it passes the image reading unit 100, the second side thereof is read and stored in the image memory 804 as the image data of the second side.

On the other hand, the recording sheets S are fed from the first sheet feeder 30 and conveyed to the conveying roller pair 40 one by one. Almost simultaneously when a recording sheet S is fed from the first sheet feeder 30, a latent image is formed on the photosensitive drum 10 by the light emitting section 21 based on the image data of the second side of the original G, which is stored in the image memory 804.

Next, a toner image formed based on the latent image is transferred onto the recording sheet S by the transfer roller 15, and then the recording sheet S is conveyed to the fixing section 50, and so forth, whereby printing on the second side is completed. As described above, printing on the reverse side is performed first.

Although in FIG. 5, feeding of the recording sheet S is started at the start of reading of image data on the second side, the recording sheet S may be conveyed after the image data on the second side has been read.

Figure 6:
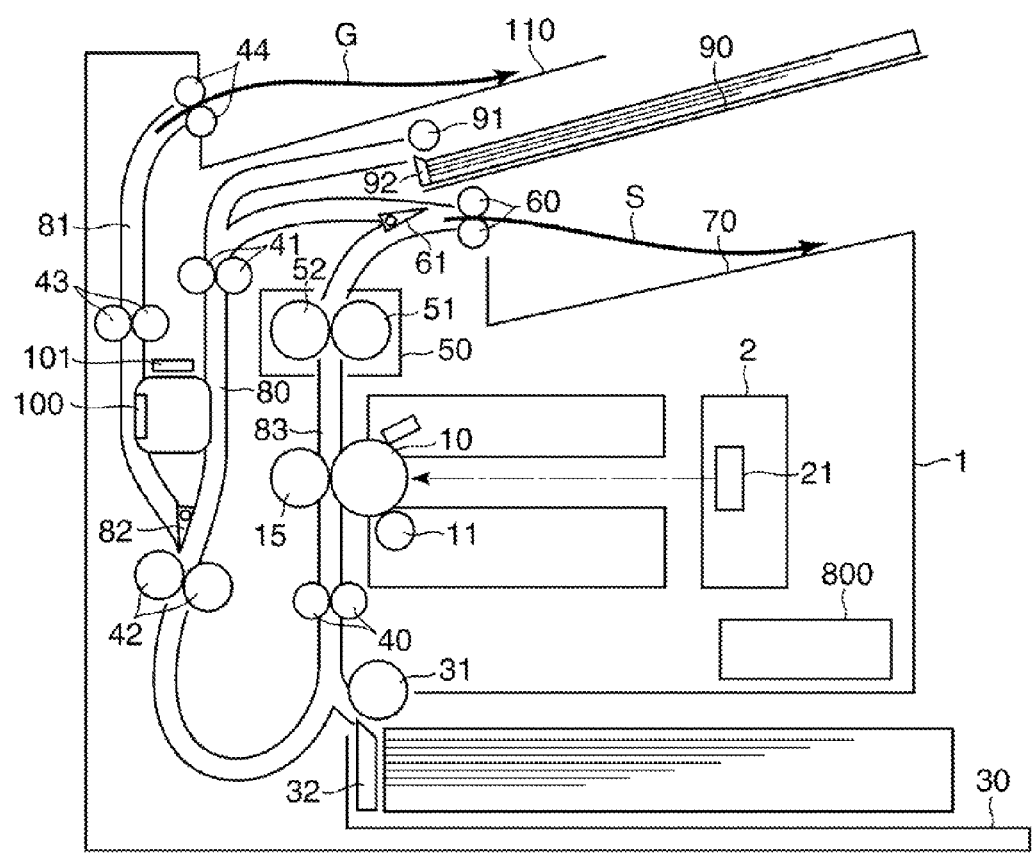
FIG. 6 is a schematic diagram of the image forming apparatus, which is useful in explaining a state thereof at a time when reading of the reverse side of the original is completed.

FIG. 6 is a schematic diagram of the image forming apparatus 1, which is useful in explaining a state thereof at a time when reading of the reverse side of the original is completed.

The original G which has been read is conveyed to the conveying roller pairs 43 and 44, and is discharged to the outside of the apparatus. As a consequence, the original G is stacked on the second discharge section 110. When the trailing end of the original G passes the switchback flapper 82, the switchback flapper 82 performs switching such that the original-dedicated conveying path 81 is closed and the shared conveying path 80 is opened so as to cause the recording sheet S to be conveyed toward the conveying roller pair 40.

The recording sheet S on which printing on the second side has been completed is conveyed toward the shared conveying path 80 by inverse rotation of the discharge roller pair 60.

Figure 7:
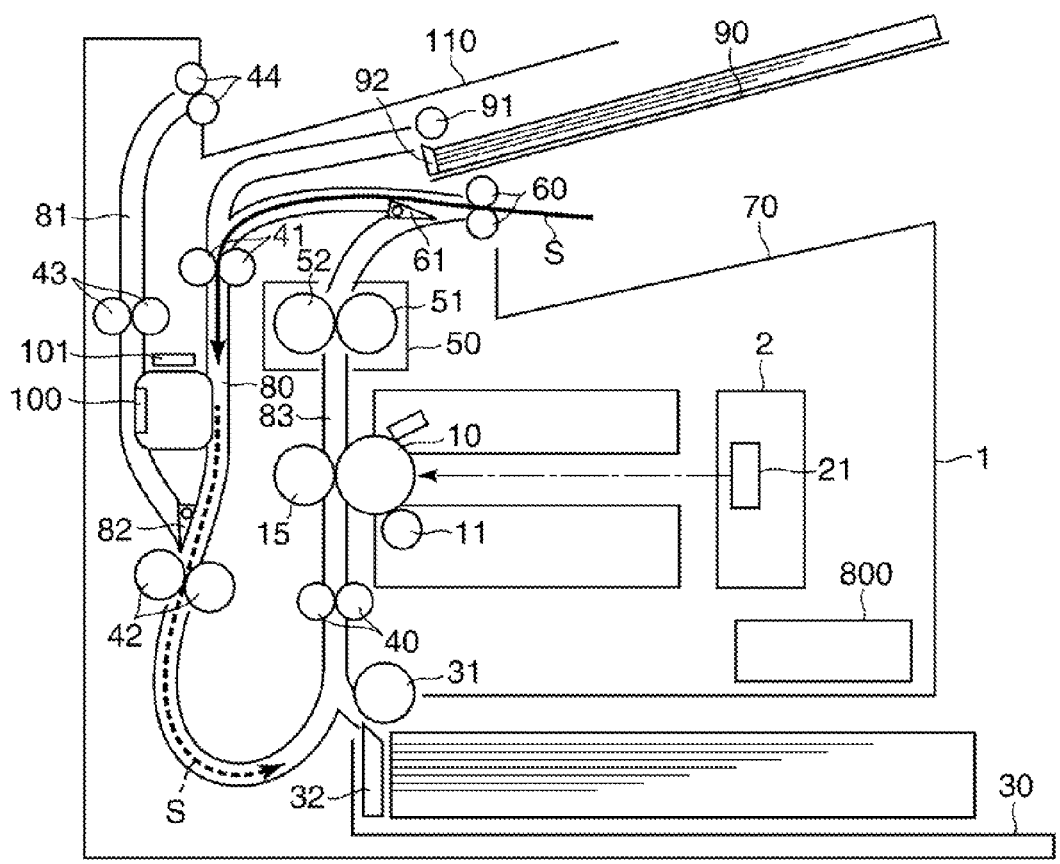
FIG. 7 is a schematic diagram of the image forming apparatus, which is useful in explaining a process for printing the front side of the recording sheet.

FIG. 7 is a schematic diagram of the image forming apparatus 1, which is useful in explaining a process for printing the front side of the recording sheet.

In FIG. 7, the recording sheet S conveyed to the shared conveying path 80 passes the image reading unit 100 which has been rotated to the first reading position, and is conveyed, as indicated by a broken line, to the conveying roller pair 40 via the conveying roller pair 42. Further, the recording sheet S is conveyed to the transfer roller 15 again. The second side of the recording sheet S has already been subjected to printing, and a latent image is formed on the photosensitive drum 10 by the light emitting section 21 based on the image data of the first side which is stored in the image memory 804.

Next, a toner image formed based on the latent image is transferred onto the recording sheet S by the transfer roller 15, and then the recording sheet S is conveyed to the fixing section 50 and so on, whereby printing on the first side is completed. The recording sheet S having the images thus printed on both sides is discharged out of the apparatus onto the first discharge section 70 where it is stacked.

Figure 8:
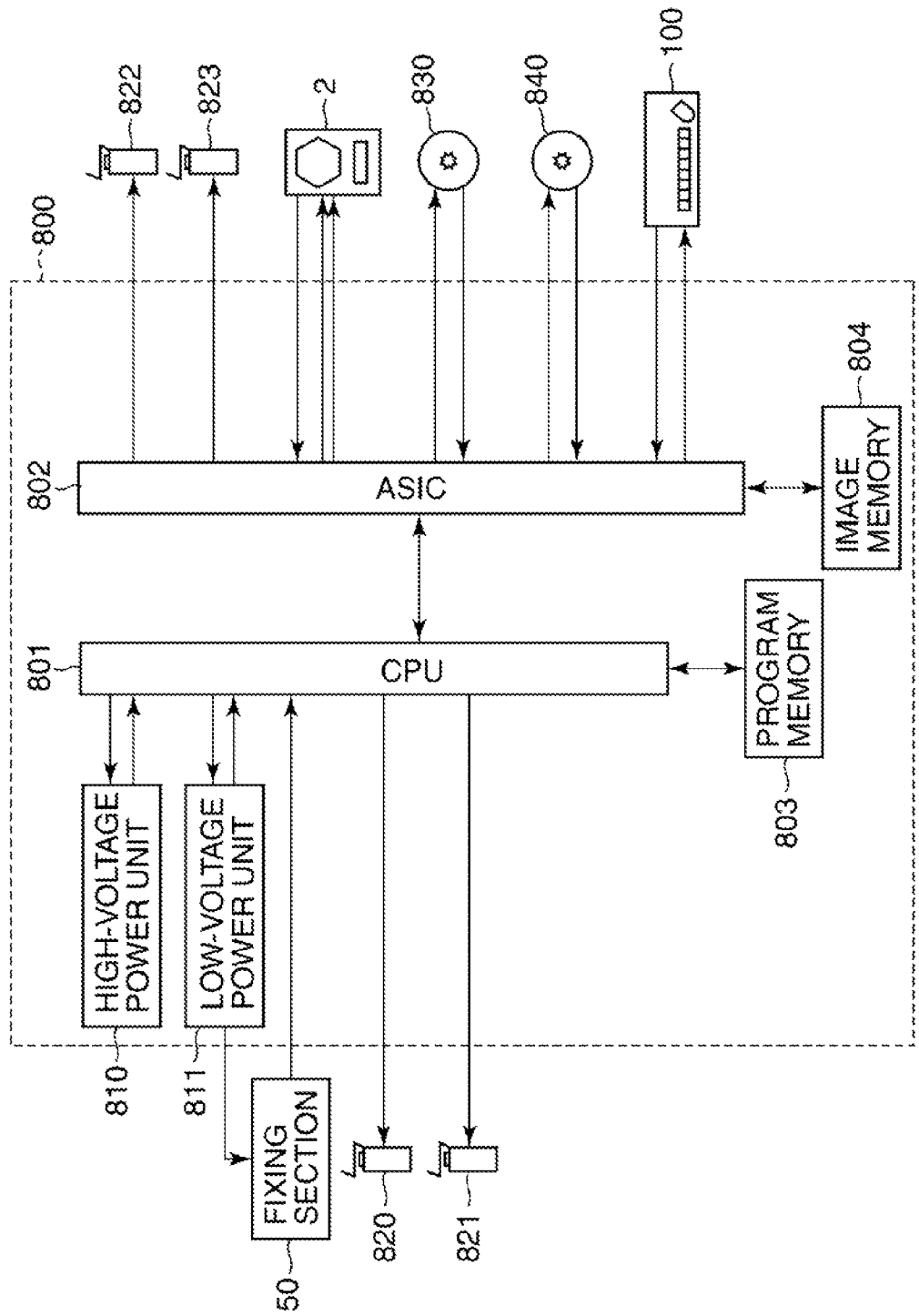
FIG. 8 is a diagram of the general arrangement of electrical equipment and peripheral devices appearing in FIG. 1.

FIG. 8 is a diagram of the general arrangement of the electrical equipment 800 and peripheral devices appearing in FIG. 1.

In FIG. 8, the electrical equipment 800 comprises a CPU (central processing unit) 801, a high-voltage power unit 810, a low-voltage power unit 811, a program memory 803, an ASIC (application specific integrated circuit) 802, and the image memory 804.

The program memory 803 stores various programs and data, and the image memory 804 stores image data representative of images as mentioned above.

The CPU 801 operates according to the various programs and data stored in the program memory 803 to thereby control the overall operation of the image forming apparatus 1. Further, as shown in FIG. 8, the CPU 801 is connected to the high-voltage power unit 810, the low-voltage power unit 811, the fixing section 50, a double-sided-printing flapper solenoid 820, a switchback solenoid 821, the program memory 803, and the ASIC 802.

The high-voltage power unit 810 controls a primary charge bias, a developing bias, a primary transfer bias, and a second transfer bias, which are required for an electrophotographic process, according to instructions from the CPU 801.

The low-voltage power unit 811 supplies power to the fixing section 50 according to instructions from the CPU 801. The CPU 801 monitors temperature using a thermistor (not shown) provided in the fixing section 50, and controls the low-voltage power unit 811 so as to maintain the fixing temperature at a fixed temperature.

The double-sided-printing flapper solenoid 820 drives the double-sided-printing flapper 61 according to instructions from the CPU 801. Further, the switchback solenoid 821 drives the switchback flapper 82 according to instructions from the CPU 801.

A CST feeding solenoid 822 drives the CST pickup roller 31 when the recording sheet S is fed, according to instructions from the CPU 801 via the ASIC 802. A CIS feeding solenoid 823 drives the CIS pickup roller 91 when an original is fed, according to instructions from the CPU 801 via the ASIC 802.

Further, the above-mentioned optical unit 2 is connected to the CPU 801 via the ASIC 802. The CPU 801 controls a polygon mirror, motors, and a laser emission element which are included in the optical unit 2 via the ASIC 802 to thereby scan the surface of the photosensitive drum 10 with a laser beam to thereby draw a desired electrostatic latent image. To this end, the CPU 801 outputs control signal to the ASIC 802 to thereby control the optical unit 2.

A main motor 830 drives the conveying roller pair 40, the photosensitive drum 10, the transfer roller 15, the heating roller 51, and the pressure roller 52, for printing on a recording sheet S, according to instructions received from the CPU 801 via the ASIC 802.

A double-sided-printing drive motor 840 drives the CIS pickup roller 91, the conveying roller pairs 41, 42, 43, and 44 according to instructions received from the CPU 801 via the ASIC 802.

The ASIC 802 performs speed control for the motors of the optical unit 2, the main motor 830, and the double-sided-printing drive motor 840 based on instructions from the CPU 801. The ASIC 802 detects a tach signal which is a pulse signal output whenever each motor is rotated, and controls the speed of each motor by outputting an acceleration or deceleration signal to the motor such that an interval of the tach signal becomes a predetermined interval.

Further, the image reading unit 100 is connected to the ASIC 802. Various signals are exchanged between the image reading unit 100 and the ASIC 802, and a description will be given hereinafter of such operations.

As described above, the construction of the electrical equipment 800 using the ASIC 802 has more merit in that it is possible to reduce the control load on the CPU 801.

The operations performed in printing an image and reading an original will be described again with reference to FIG. 8. First, the operation performed in printing will be described. Upon receipt of a print signal, the CPU 801 drives the main motor 830, the double-sided-printing drive motor 840, and the CST feeding solenoid 822, to thereby convey the recording sheet S.

After the toner image formed on the surface of the photosensitive drum 10 is transferred onto the recording sheet S by the transfer roller 15, the toner image is fixed by the fixing section 50, and then the recording sheet S is discharged onto the first discharge section 70 by the discharge roller pair 60.

When fixing the toner image, the CPU 801 generates a desired amount of heat by supplying predetermined electric power to the fixing section 50 via the low-voltage power unit 811, and applies the generated heat to the recording sheet S to thereby fuse and fix the toner image on the recording material.

Next, the operation performed in reading the original will be described. First, the CPU 801 receives from the host computer, not shown, or the operating section 870, a scan command which instructs reading of an original. Then, the CPU 801 drives the double-sided-printing flapper solenoid 820 and the double-sided-printing motor 840 and operates the CIS feeding solenoid 822 to thereby cause torque of the double-sided-printing motor 840 to be transmitted to the CIS pickup roller 91 to convey the original G.

The CPU 801 stores image data read by the image reading unit 100 via the ASIC 802 in the image memory 804 connected to the ASIC 802. Then, the CPU 801 drives the switchback solenoid 821 to operate the switchback flapper 82 such that the original is guided into the original-dedicated conveying path 81, and causes the double-sided-printing drive motor 840 to reversely rotate to convey the original G to the second discharge section 110.

Figure 9:
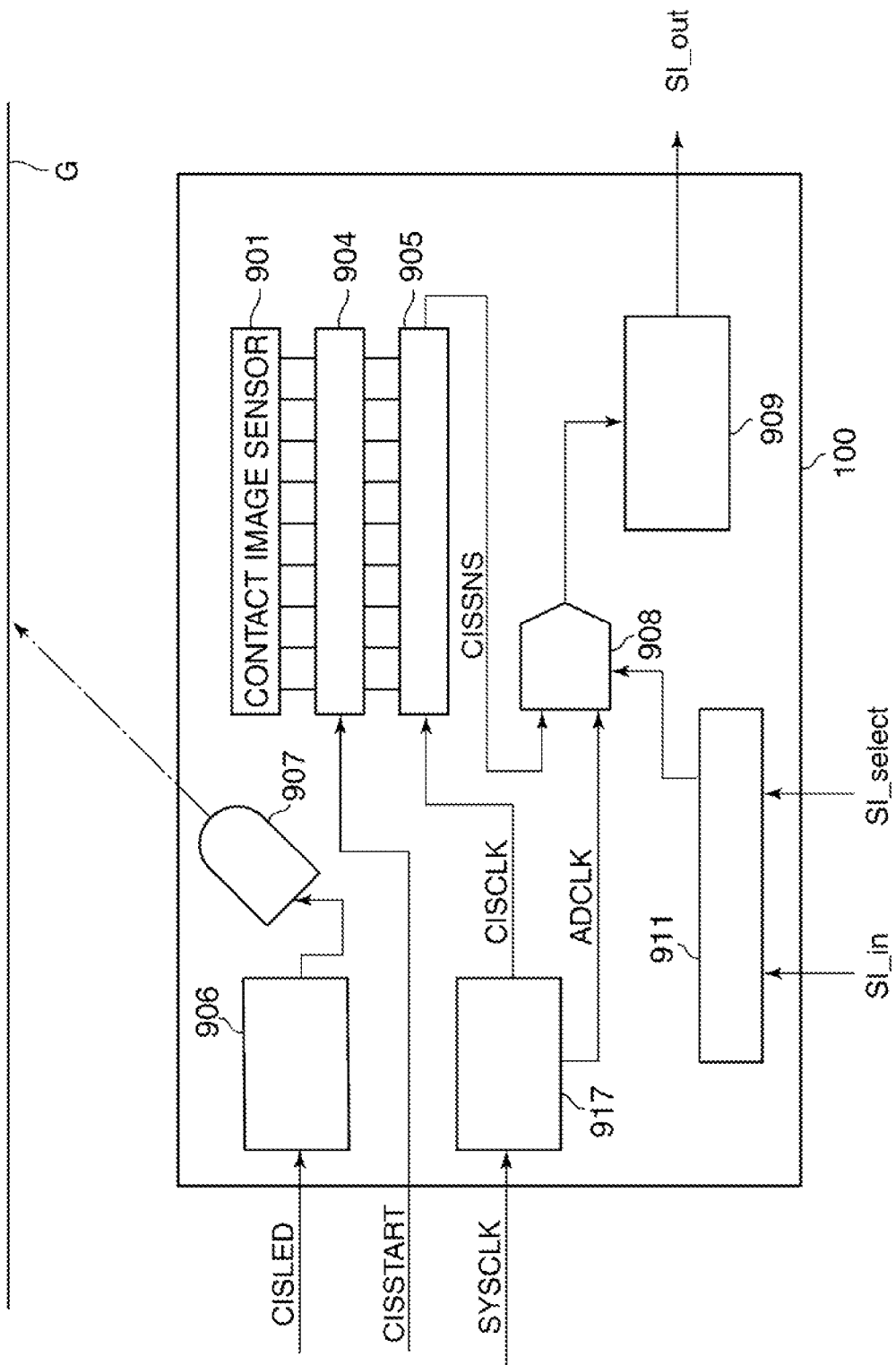
FIG. 9 is a schematic diagram of an image reading unit appearing in FIG. 1.

FIG. 9 is a schematic diagram of the image reading unit 100 appearing in FIG. 1.

In FIG. 9, the image reading unit 100 includes a contact image sensor (CIS) 901, an output buffer 904, and a shift register 905. The image reading unit 100 further includes an electric current amplifier 906, a light emitting device 907, an A/D converter 908, an output interface circuit 909, a control circuit 911, and a timing generator 917.

The contact image sensor 901 is formed by arranging photodiodes corresponding in number to a plurality of pixels in an array, and for example, the photodiodes corresponding in number to 10368 pixels are arranged in an array at a specified main scan density (e.g. 1200 dpi). The light emitting device 907 uniformly irradiates an original G.

Next, the signals exchanged with the ASIC 802 will be described. A CISSTART signal is a start pulse signal to start the contact image sensor 901. A CISCLK signal is a clock signal transferred to the contact image sensor 901.

A SYSCLK signal is a system clock signal for determining the operating speed of the contact image sensor 901. An ADCLK signal is a CIS sampling clock signal for determining a sampling speed of the A/C converter 908. A CISLED signal is a light emitting device control signal for controlling the light emitting device 907.

A Sl_in signal and a Sl_select signal are signals for variably controlling an A/D conversion gain of the A/D converter 908. For example, when the contrast of a picked up image cannot be obtained, the CPU 801 can increase the contrast by increasing the A/D conversion gain of the A/D converter 908. This makes it possible to always obtain the optimum contrast.

A CISSNS signal is a signal which is indicative of data set in the output buffer 904 and is output by the shift register 905. An Sl_out signal is a signal generated by converting the CISSNS signal to a digital signal by the A/D converter 908.

Next, the operation of the image reading unit 100 will be described. When the CISSTART signal is activated, the contact image sensor 901 starts accumulating electrostatic charges according to received light, and sequentially sets data in the output buffer 904.

Next, when the CISCLK signal is provided, the data set in the output buffer 904 is transferred to the A/D converter 908 by the shift register 905 as the CISSNS signal. The frequency of the CISCLK signal is e.g. in a range of approximately 500 kHz to 1 MHz.

The CISSNS signal has a predetermined data assured area, and hence it is necessary to perform sampling after the elapse of a predetermined time period from the timing of rising of the CISCLK signal. Further, the CISSNS signal is output in synchronism with both of a rising edge and a falling edge of the CISCLK signal. For this reason, the frequency of the ADCLK signal is set to twice the frequency of the CISCLK signal, and the CISSNS signal is sampled at the rising edge of the ADCLK signal.

The timing generator 917 divides the frequency of the SYSCLK signal to generate the ADCLK signal and the CISCLK signal, and the phase of the ADCLK signal has a lag corresponding to the above-mentioned data assured area with respect to the CISCLK signal.

The CISSNS signal converted from analog to digital by the A/D converter 908 is controlled by the output interface circuit 909 at a predetermined timing, and is output as the Sl_out signal of serial data. At this time, an analog output reference voltage is output as the CISSNS signal to prevent pulses thereof corresponding in number to the predetermined number of pixels starting from the CISSTART signal, from being used as effective pixels.

Although in the above description, all pixels are output as the CISSNS signal, the pixels may be divided into areas, and signals read from a plurality of areas may be simultaneously subjected to A/D conversion to perform high-speed reading. Further, although in the above description, the contact image sensor 901 is used for the image reading unit 100, a CMOS sensor or a CCD sensor may be used in place of the contact image sensor 901.

Figure 10:
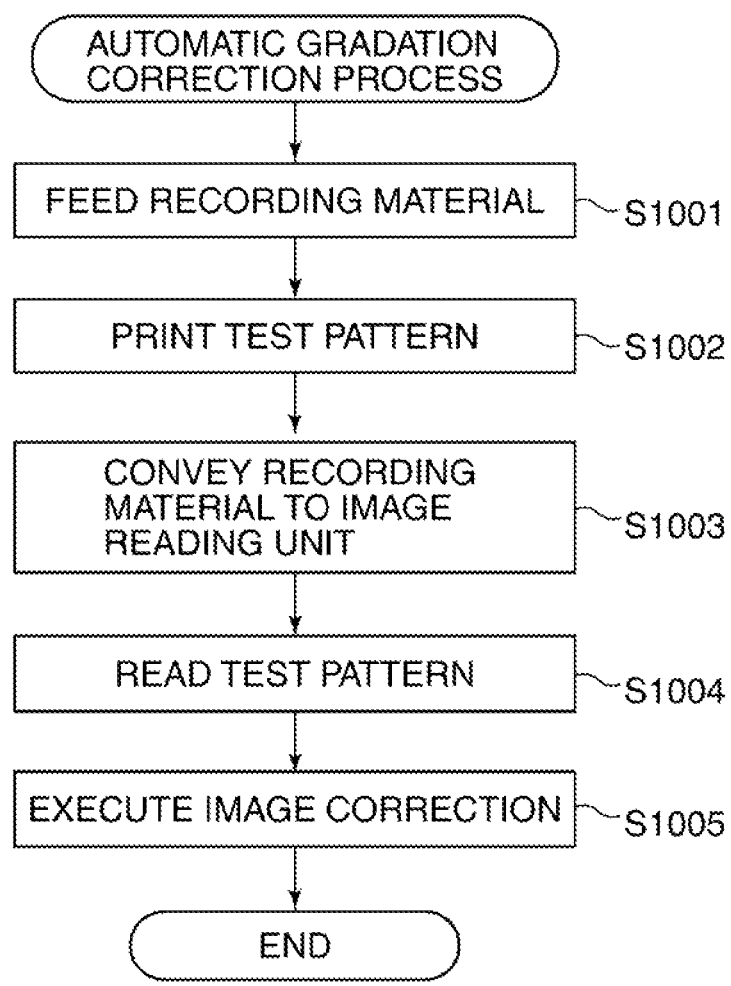
FIG. 10 is a flowchart of an automatic gradation correction process executed by a CPU.

FIG. 10 is a flowchart of an automatic gradation correction process executed by the CPU 801 appearing in FIG. 8.

In FIG. 10, a recording sheet S set in the first sheet feeder 30 is fed and conveyed to the transfer roller 15 (step S1001). The step S1001 corresponds to the functions of a sheet feeder unit configured to feed a recording material, and another conveying unit configured to convey the fed recording material to a reading unit via a shared conveying path.

Next, a specified test pattern (a specified test chart) which is a gradation pattern (a chart) set in advance is printed (step S1002). The step S1002 corresponds to the function of an image forming unit configured to form a gradation pattern on a recording material.

The recording sheet S having the test pattern printed thereon by transferring and fixing of a toner image thereto is conveyed to the discharge roller pair 60 (see FIG. 1).

Figure 11:
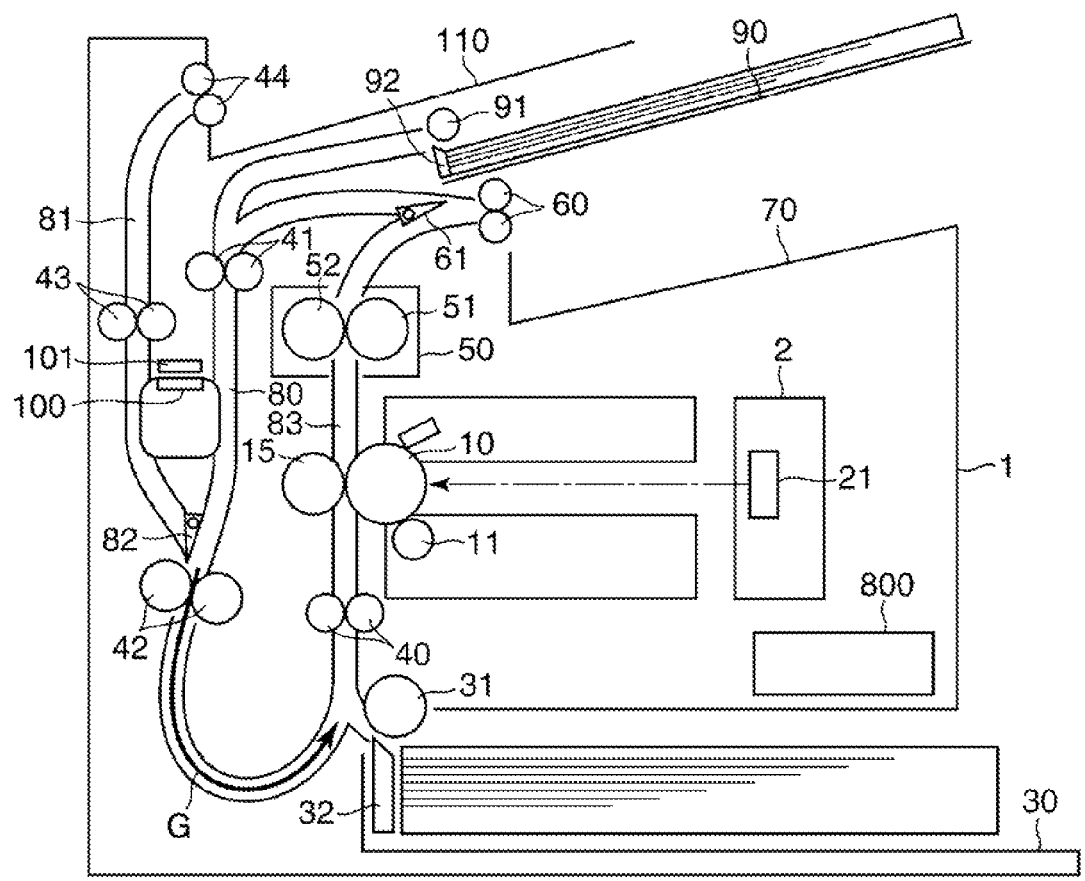
FIG. 11 is a diagram useful in explaining a state of the image forming apparatus shown in FIG. 1 before a test pattern on a recording sheet is read.

Next, the CPU 801 causes the discharge roller pair 60 to convey the recording sheet S to the shared conveying path 80 (see FIG. 2). The recording sheet S is conveyed to the conveying roller pair 42 via the conveying roller pair 41 (see FIG. 11).

Figure 12:
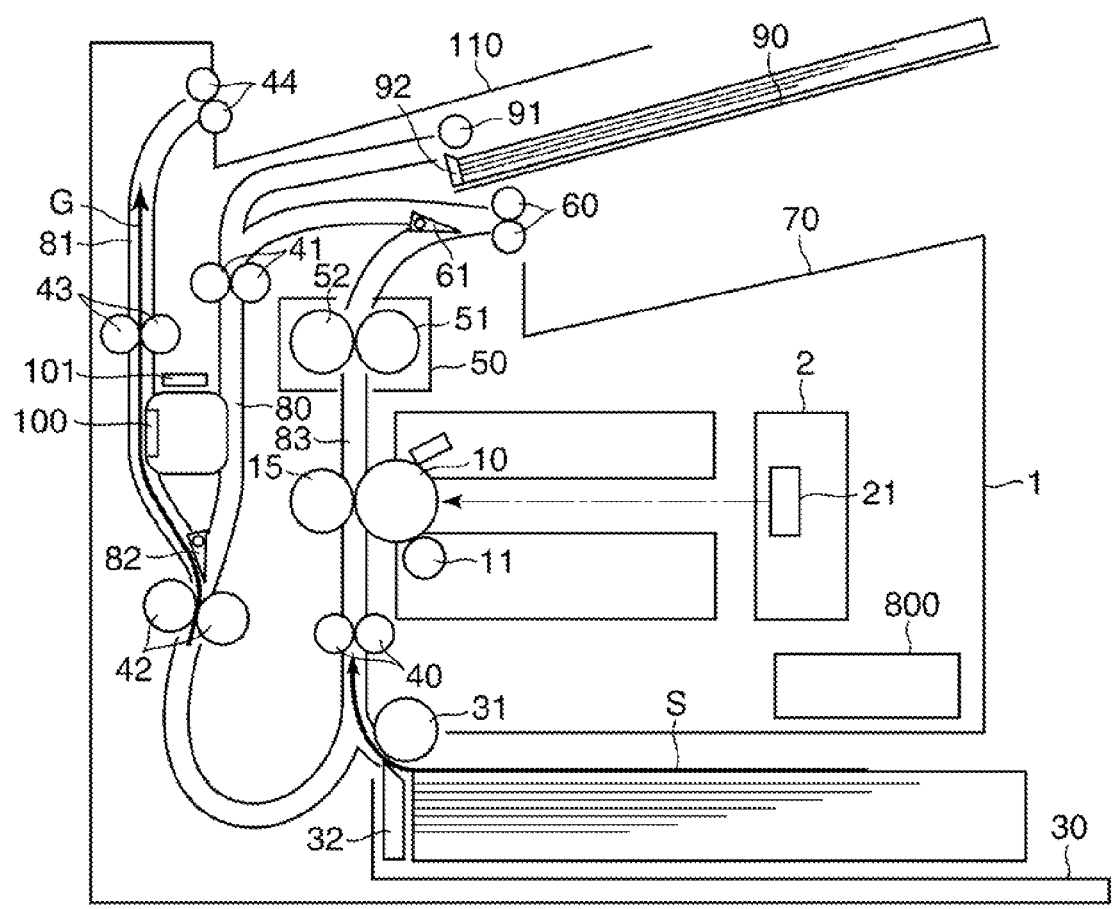
FIG. 12 is a diagram useful in explaining a state of the image forming apparatus shown in FIG. 1 at a time when the test pattern on the recording sheet is read.

Then, the recording sheet S having the test pattern printed thereon is caused to switch back by the conveying roller pair 42 to thereby convey the recording sheet S to the image reading unit 100 (step S1003), and the image reading unit 100 reads the test pattern (step S1004: see FIG. 12). The step S1003 corresponds to the function of a conveying unit configured to convey the recording material having the gradation pattern formed thereon to the reading unit via the shared conveying path.

Next, image correction is performed using image data indicative of the test pattern read in the step S1004 (step S1005), followed by terminating the present process. The step S1005 corresponds to the function of a correction unit configured to cause the reading unit to read the recording material having a gradation pattern formed thereon and conveyed by the conveying unit, and perform gradation correction based on the read gradation pattern.

Note that after the test pattern on the recording sheet S is read in the step S1004, the recording sheet S is discharged onto the second discharge section 110 by the conveying roller pairs 43 and 44.

In this process, when gradation correction is performed as image correction, a gradation pattern is printed in the step S1002, and gradation correction is performed in the step S1005. Further, when performing gradation correction for a color image as image correction, gradation patterns using the respective colors of CMYK are printed in the step S1002, and gradation correction is performed in the step S1005.

Figure 13:
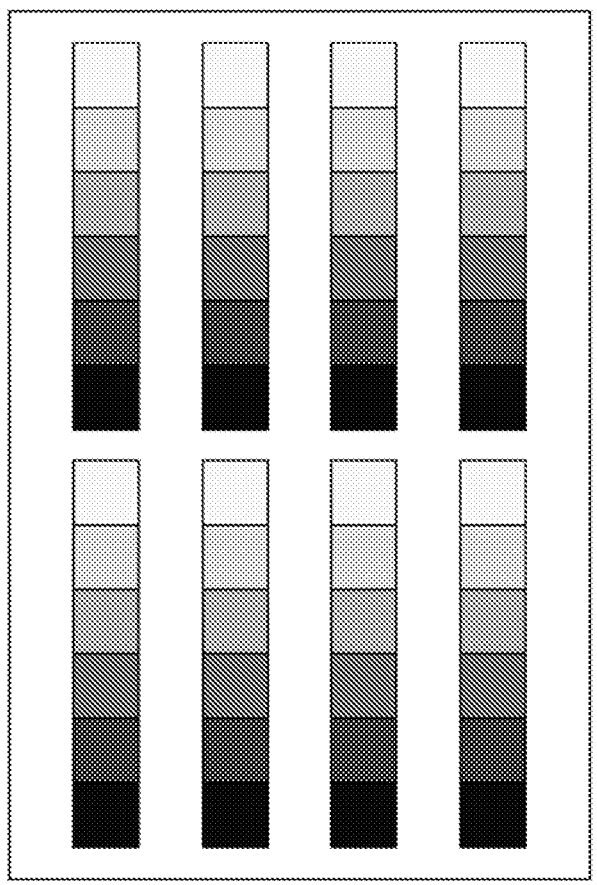
FIG. 13 is a diagram showing an example of gradation patterns.

FIG. 13 is a diagram showing an example of the gradation patterns.

FIG. 13 shows the eight gradation patterns, and when performing gradation correction for a color image, these are the gradation patterns using the respective colors of CMYK.

Next, the variation of the automatic gradation correction process in FIG. 10 will be described.

Figure 14:
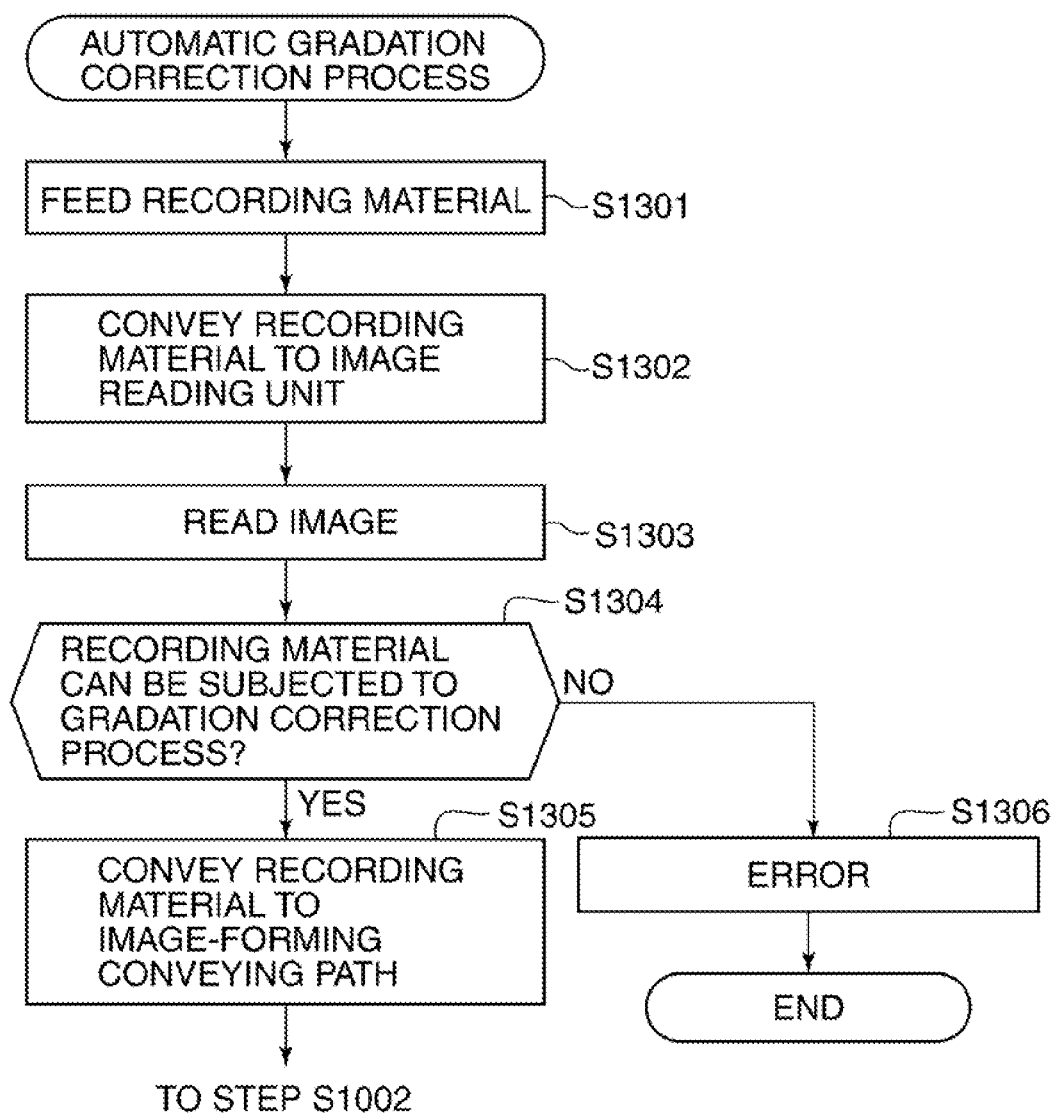
FIG. 14 is a flowchart of a first variation of the automatic gradation correction process executed by the CPU appearing in FIG. 8.

FIG. 14 is a flowchart of a first variation of the automatic gradation correction process executed by the CPU 801 appearing in FIG. 8.

In FIG. 14, a recording sheet S is fed from the first sheet feeder 30 (step S1301). Then, the recording sheet S is conveyed to the conveying roller pair 60 (see FIG. 1). In this step, the recording sheet S is only conveyed along the image-forming conveying path 83, but printing is not performed.

Next, the CPU 801 controls the discharge roller pair 60 to convey the recording sheet S to the shared conveying path 80 (step S1302: see FIG. 2). Then, the recording sheet S is read (step S1303). Then, the CPU 801 determines using image data indicative of the read recording sheet S whether or not the recording sheet S is a recording sheet which can be used for the gradation correction process (step S1304). A method of determining whether or not the recording sheet S is a recording sheet which can be used for the gradation correction process will be described hereinafter. The step S1304 corresponds to the function of a determination unit configured to determine, based on image data indicative of the recording material, which is acquired by reading the conveyed recording material using the reading unit, whether or not the recording material is a recording material suitable for gradation correction by the correction unit.

If it is determined in the step S1304 that the recording sheet S is a recording sheet which can be used for the gradation correction process (YES to the step S1304), the recording sheet S is conveyed to the image-forming conveying path 83 by the conveying roller pair 42 (step S1305: see FIG. 1). Then, the process proceeds to the step S1002 in FIG. 10, wherein the gradation correction process is executed.

On the other hand, if it is determined in the step S1304 that the recording sheet S is not a recording sheet which can be used for the gradation correction process (NO to the step S1304), the CPU 801 determines that an automatic gradation correction error has occurred (step S1306), and discharges the recording sheet S, followed by terminating the present process. In this step, the recording sheet S can be discharged to the first discharge section 70 or the second discharge section 110.

The above-mentioned method of determining whether or not the recording sheet S is a recording sheet which can be used for the gradation correction process will be described. One example of the determination method comprises analyzing read image data, determining, when the recording sheet S is a white paper sheet, that the gradation correction process can be executed, and determining, when the recording sheet S is not a white paper sheet, that the gradation correction process cannot be executed.

Another example of the determination method comprises analyzing read image data, determining, when the recording sheet S is not a colored paper sheet, that the gradation correction process can be executed, and determining, when the recording sheet S is a colored paper sheet, that the gradation correction process cannot be executed. As mentioned above, when the recording material is not a white paper sheet or the recording material is a colored paper sheet, it is determined that the recording material is a recording material which cannot be used for gradation correction by the correction unit.

Next, a second variation of the automatic gradation correction process in FIG. 14 will be described.

Figure 15:
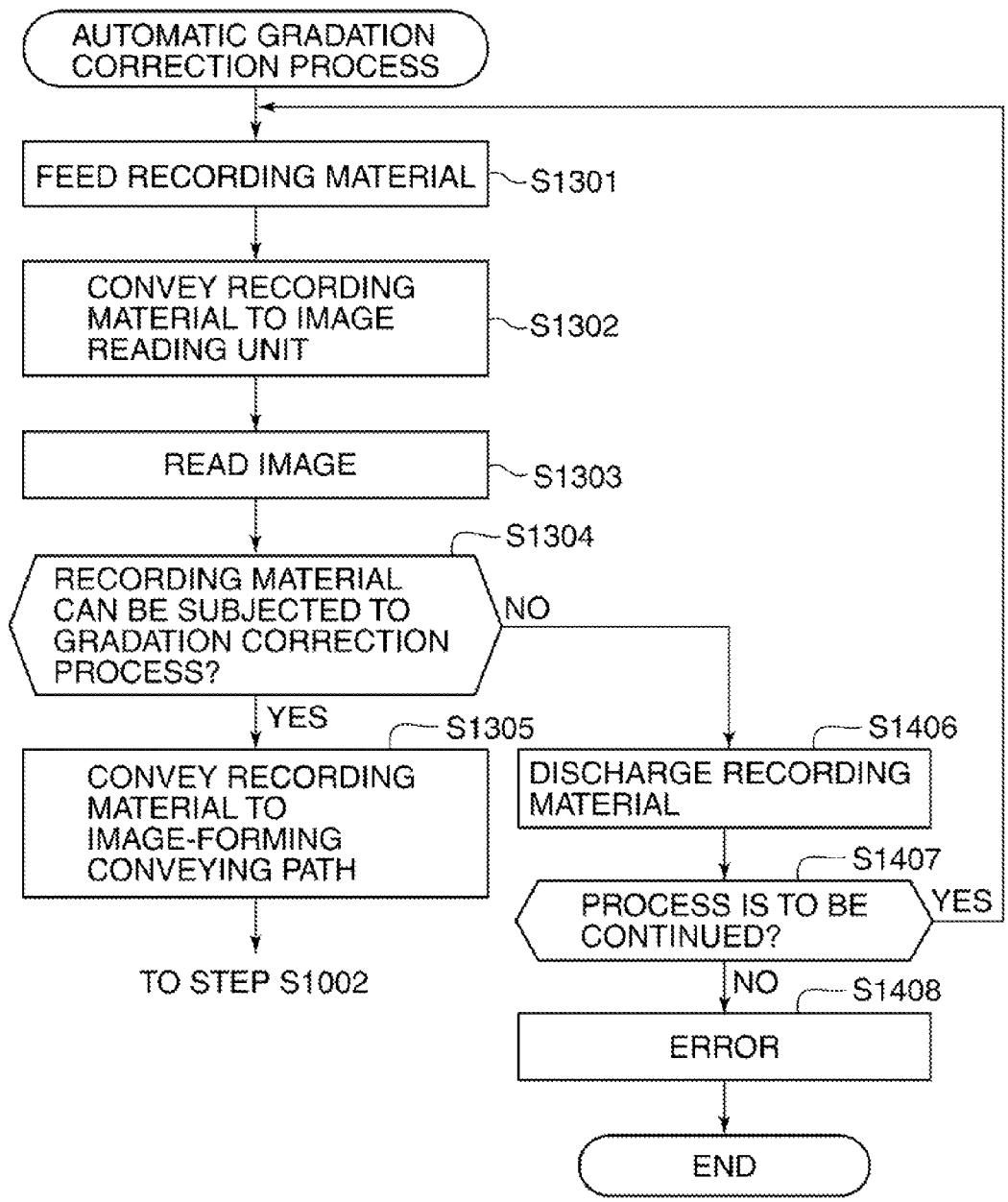
FIG. 15 is a flowchart of a second variation of the automatic gradation correction process executed by the CPU appearing in FIG. 8.

FIG. 15 is a flowchart of the second variation of the automatic gradation correction process executed by the CPU 801 appearing in FIG. 8.

The automatic gradation correction process in FIG. 15 is distinguished from that in FIG. 14 in steps executed after the answer to the question of the step S1304 in FIG. 14 is negative, and hence will be described from the step S1304.

If it is determined in the step S1304 that the recording sheet S is not a recording sheet which can be used for the gradation correction process (NO to the step S1304), the recording sheet S is discharged to one of the first discharge section 70 and the second discharge section 110 (step S1406). The step S1406 corresponds to the function of a discharge unit configured to, when it is determined by the determination unit that the recording material is not a recording material suitable for gradation correction performed by the correction unit, discharge the recording material.

Next, it is determined whether or not the automatic gradation correction process is to be continued (step S1407). In the step S1407, it is determined that the automatic gradation correction process is to be continued when the number of occurrences of the automatic gradation correction error does not reach an upper limit value of the number of retrying operations set in advance, whereas it is determined that the automatic gradation correction process is not to be continued when the number of occurrences of the automatic gradation correction error reaches the upper limit value.

If it is determined in the step S1407 that the automatic gradation correction process is to be continued (YES to the step S1407), the process returns to the step S1301.

On the other hand, if it is determined in the step S1407 that the automatic gradation correction process is not to be continued (NO to the step S1407), the CPU 801 determines that an automatic gradation correction error has occurred (step S1408), and the recording sheet S is discharged, followed by terminating the present process.

As described above, in the present embodiment, the shared conveying path 80 is configured to serve both as a conveying path, different from the image-forming conveying path 83, for use in conveying a recording sheet during double sided printing, and as the original conveying path, whereby it is made possible to provide an image forming apparatus which is inexpensive, capable of performing printing during an reading operation, and capable of reducing reading time.

Further, in the present embodiment, a gradation pattern set in advance is formed on recording material, and the recording material having the gradation pattern formed thereon is conveyed to the image reading unit 100 along the shared conveying path. Then, gradation correction is performed using image data indicative of the gradation pattern acquired by reading the conveyed recording material having the gradation pattern formed thereon by the image reading unit 100. This enables the image forming apparatus to perform gradation correction by itself without a user's operation for setting the recording material having the gradation pattern formed thereon on the original sheet feeder. Therefore, it is possible to provide an image forming apparatus capable of performing gradation correction without causing a user to perform a troublesome operation.

Further, by reading the recording material before outputting a gradation pattern, it is possible to determine whether or not the recording material is a sheet which can be subjected to gradation correction. This makes it possible to reduce errors in gradation correction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-105992, filed May 7, 2012, which is hereby incorporated by reference herein in its entirety.

What is claimed is:

1. An image forming apparatus comprising:
   a holding unit configured to hold a sheet;
   a feeding unit configured to feed a sheet;
   a reading unit configured to read an image on a sheet;
   an image forming unit configured to form an image or a chart onto a sheet;
   a control unit configured to perform a first convey operation in which the sheet held by the holding unit is conveyed to said reading unit, and a second convey operation in which the sheet having the chart formed thereon by said image forming unit is conveyed to said reading unit; and
   a correction unit configured to cause said reading unit to read the chart on the sheet conveyed by the second convey operation, and perform gradation correction based on the chart read by said reading unit,
   wherein, when said reading unit reads an image on the sheet conveyed by the first convey operation, said image forming unit is configured to form the image read by said reading unit onto the sheet fed by the feeding unit.

2. The image forming apparatus according to claim 1, further comprising:
   a determination unit configured to determine whether or not the sheet conveyed to said image forming unit in order to form the chart is a sheet suitable for gradation correction performed by said correction unit; and a discharge unit configured to, when it is determined by said determination unit that the sheet conveyed to said image forming unit is not a sheet suitable for gradation correction performed by said correction unit, discharge the conveyed sheet without forming the chart.

3. The image forming apparatus according to claim 2, wherein when the sheet conveyed to said image forming unit is not a white paper sheet, or when the sheet conveyed to said image forming unit is a colored paper sheet, said determination unit determines that the sheet conveyed to said image forming unit is not a sheet suitable for gradation correction.

4. The image forming apparatus according to claim 1, wherein said image forming unit forms a color chart set in advance onto the sheet.

5. The image forming apparatus according to claim 4, wherein said image forming unit forms a color image onto the sheet with toners of four colors.

6. The image forming apparatus according to claim 1, wherein, in the second convey operation, the sheet having the chart formed thereon is conveyed to said reading unit without a user's operation after the image forming unit forms the chart onto the sheet.

7. A method for controlling an image forming apparatus having a holding unit configured to hold a sheet, a feeding unit configured to feed a sheet, a reading unit configured to read an image on a sheet, and an image forming unit configured to form an image or a chart onto a sheet, the method comprising:

performing a first convey operation in which the sheet held by the holding unit is conveyed to said reading unit;

performing a second convey operation in which the sheet having the chart formed thereon by said image forming unit is conveyed to said reading unit;

causing the reading unit to read the chart on the sheet conveyed by the second convey operation, and performing gradation correction based on the chart read by the reading unit, and when said reading unit reads an image on the sheet conveyed by the first convey operation, causing said image forming unit to form the image read by said reading unit onto the sheet fed by the feeding unit.

8. A non-transitory computer-readable storage medium storing a computer-executable program for executing a method for controlling an image forming apparatus having a holding unit configured to hold a sheet, a feeding unit configured to feed a sheet, a reading unit configured to read an image on a sheet, and an image forming unit configured to form an image or a chart onto a sheet, wherein the method comprises:

performing a first convey operation in which the sheet held by the holding unit is conveyed to said reading unit;

performing a second convey operation in which the sheet having the chart formed thereon by said image forming unit is conveyed to said reading unit;

causing the reading unit to read the chart on the sheet conveyed by the second convey operation, and performing gradation correction based on the chart read by the reading unit, and when said reading unit reads an image on the sheet conveyed by the first convey operation, causing said image forming unit to form the image read by said reading unit onto the sheet fed by the feeding unit.

\* \* \* \* \*